United States Patent
Wu et al.

(10) Patent No.: US 6,362,916 B2
(45) Date of Patent: *Mar. 26, 2002

(54) ALL FIBER GAIN FLATTENING OPTICAL FILTER

(75) Inventors: Weiti Wu, Milpitas; Yu-Li Ko; Gary Chung, both of Fremont, all of CA (US)

(73) Assignee: Fiver Laboratories, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,985

(22) Filed: Feb. 9, 1999

Related U.S. Application Data (60) Provisional application No. 60/101,853, filed on Sep. 25, 1998.

(51) Int. Cl.[7] .................................................. H01S 3/00
(52) U.S. Cl. ............................... 359/337.1; 359/337.2; 359/341.1; 359/885; 385/127
(58) Field of Search ................................ 359/337, 341, 359/885, 337.1, 337.2, 341.1; 385/30, 131, 127, 128; 257/98; 248/290

(56) References Cited

U.S. PATENT DOCUMENTS

| 4,758,064 A | 7/1988 | Neefe | 350/96.23 |
| 4,931,076 A | 6/1990 | Berkey | 65/4.2 |

(List continued on next page.)

FOREIGN PATENT DOCUMENTS

| JP | 279805 | * 12/1986 | |
| JP | 61279805 | 12/1986 | G02B/6/10 |
| JP | 183736 | * 7/1999 | |
| JP | 326668 | * 11/1999 | |

OTHER PUBLICATIONS

Sojero et al, Electron. Commun. Japan, vol. 57, 190 9, PP–121–128; Abstract Herewith & Article, Sep. 1974.*

Safaai et al, Southeastern '89 Proc., EIT, PP 1195–1199; Abstract Only Herewith, Apr. 12, 1989.*

Chen, L.R. et al., "Transmission Filters with Multiple Flattened Passbands Based on Chirped Moire Gratings," IEEE Photonics Technology Letters, vol. 10, No. 9, Sep. 1998, pp 1283–1285.

Ortega, B. et al., "Accurate tuning of mismatched twin–core fiber filters," Optics Letters, vol. 23, No. 16, Aug. 15, 1998, pp 1277–1279.

(List continued on next page.)

*Primary Examiner*—Nelson Moskowitz
(74) *Attorney, Agent, or Firm*—Haverstock & Owens L (57) ABSTRACT

An all fiber optical filter is formed by stretching an optical fiber. The all fiber filter includes a core, an inner cladding and an outer cladding. A core index of refraction is greater than an outer cladding index of refraction. The outer cladding index of refraction is greater than an inner cladding index of refraction. The all fiber optical filter attenuates a portion of an optical signal by transferring optical energy from the core to the outer cladding by evanescent coupling. The all fiber optical filter has a compact structure, which prevents bending and provides stable temperature performance. The all fiber optical filter is preferably used in Wavelength Division Multiplexing (WDM) systems for gain flattening of gain responses from Erbium Doped Fiber Amplifiers (EDFAs). Alternatively, the all fiber optical filter is used in other applications where optical filtering or attenuation is needed. The all fiber optical filter is manufactured by holding a length of an appropriate optical fiber between two clamps, heating the optical fiber, and stretching the optical fiber until a predetermined characteristic of the all fiber optical filter is achieved.

12 Claims, 10 Drawing Sheets

U.S. PATENT DOCUMENTS

| | | | | |
|---|---|---|---|---|
| 5,054,874 A | | 10/1991 | Hill et al. | 385/28 |
| 5,067,789 A | * | 11/1991 | Hall et al. | 385/27 |
| 5,115,338 A | | 5/1992 | DiGiovanni et al. | 359/337 |
| 5,170,447 A | | 12/1992 | Heidemann | 385/24 |
| 5,179,603 A | | 1/1993 | Hall et al. | 385/24 |
| 5,210,808 A | | 5/1993 | Grasso et al. | 385/27 |
| 5,260,823 A | | 11/1993 | Payne et al. | 359/341 |
| 5,283,686 A | | 2/1994 | Huber | 359/337 |
| 5,311,606 A | | 5/1994 | Asakura | 385/33 |
| 5,321,790 A | | 6/1994 | Takahashi et al. | 385/140 |
| 5,333,232 A | * | 7/1994 | Yanajawa et al. | 385/127 |
| 5,363,385 A | | 11/1994 | Heidemann | 372/6 |
| 5,415,730 A | | 5/1995 | Canning et al. | 216/17 |
| 5,430,572 A | | 7/1995 | DiGiovanni et al. | 359/341 |
| 5,467,218 A | | 11/1995 | Takeda et al. | 359/341 |
| 5,473,713 A | | 12/1995 | Ronarc'H et al. | 385/28 |
| 5,473,714 A | * | 12/1995 | Vengsarkar | 385/43 |
| 5,499,132 A | | 3/1996 | Tojo et al. | 359/281 |
| 5,513,033 A | | 4/1996 | Bricheno et al. | 359/341 |
| 5,530,710 A | | 6/1996 | Grubb | 372/6 |
| 5,568,310 A | | 10/1996 | Naito | 359/341 |
| 5,583,689 A | | 12/1996 | Cassidy et al. | 359/341 |
| 5,627,934 A | * | 5/1997 | Muhs | 385/127 |
| 5,689,595 A | | 11/1997 | Pan | 385/27 |
| 5,696,615 A | | 12/1997 | Alexander | 359/134 |
| 5,717,799 A | | 2/1998 | Robinson | 385/27 |
| 5,786,915 A | | 7/1998 | Scobey | 359/127 |
| 5,857,053 A | * | 1/1999 | Kane | 385/127 |
| 5,892,615 A | * | 4/1999 | Gruff et al. | 359/341 |
| 5,930,436 A | * | 7/1999 | Okamura et al. | 385/127 |
| 5,982,799 A | * | 11/1999 | Bour et al. | 372/50 |

OTHER PUBLICATIONS

Ortega, B. et al., "Characteristics of Mismatched Twin–Core Fiber Spectral Filters," IEEE Photonics Technology Letters, vol. 10, No. 7, Jul. 1998, pp 991–993.

Agrawal, G.P., "Fiber–Optic Communication Systems," Wiley, New York, 1997, pp 414–415.

Haus, H.A., "Waves and Fields in Optoelectronics," Prentice–Hall, Englewood Cliffs, NJ, 1984, pp 197–234.

* cited by examiner

ALL FIBER GAIN FLATTENING OPTICAL FILTER

RELATED APPLICATIONS

This application claims priority under 35 U.S.C. § 119(e) of the co-pending U.S. provisional application Ser. No. 60/101,853 filed on Sep. 25, 1998 and entitled "ALL-FIBER EDFA GAIN FLATTENING FILTER." The provisional application Ser. No. 60/101,853 filed on Sep. 25, 1998 and entitled "ALL-FIBER EDFA GAIN FLATTENING FILTER" is also hereby incorporated by reference.

FIELD OF THE INVENTION

The present invention relates to the field of fiber optic communications. More particularly, the present invention relates to the field of filtering of amplified signals used in fiber optic communications systems.

BACKGROUND OF THE INVENTION

Figure 1:
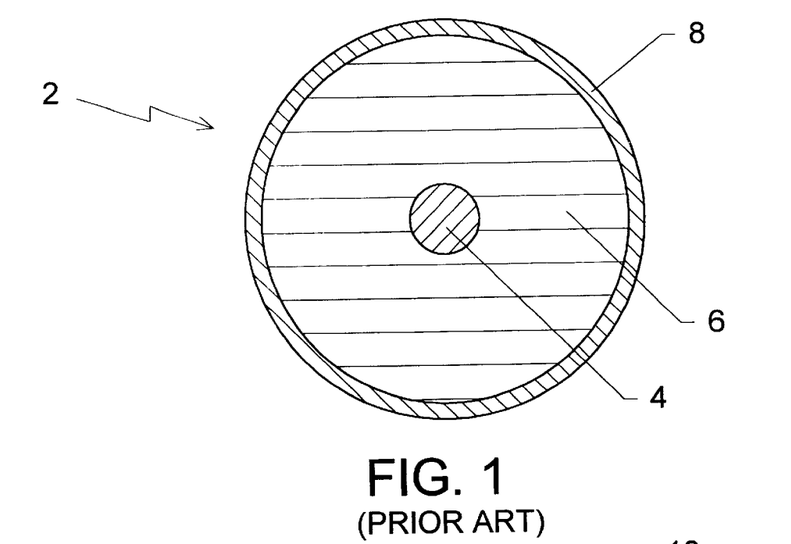
FIG. 1 illustrates a cross section of an optical fiber of the prior art.

Fiber optic communication systems use optical fibers to carry a modulated lightwave signal between a transmitter and a receiver. A cross-section of a typical optical fiber is illustrated in FIG. 1. The optical fiber 2 includes a core 4 and a cladding 6. Optionally, the optical fiber 2 includes a jacket 8. In a typical optical fiber, the core 4 has an index of refraction greater than the cladding 6, thereby forming an optical waveguide. By maintaining the core diameter within an allowed range, light traveling within the core 4 is limited to a single mode. If included, the jacket 8 protects the outer surface of the cladding 6 and absorbs stray light traveling within the cladding 6. A typical single mode optical fiber intended for use in communication systems operating at a 1300 nm wavelength band or a 1550 nm wavelength band has a core diameter of about 8 μm and a cladding outside diameter of 125 μm. If the jacket 8 is included, the jacket 8 typically has an outside diameter of 250 μm.

Figure 2:
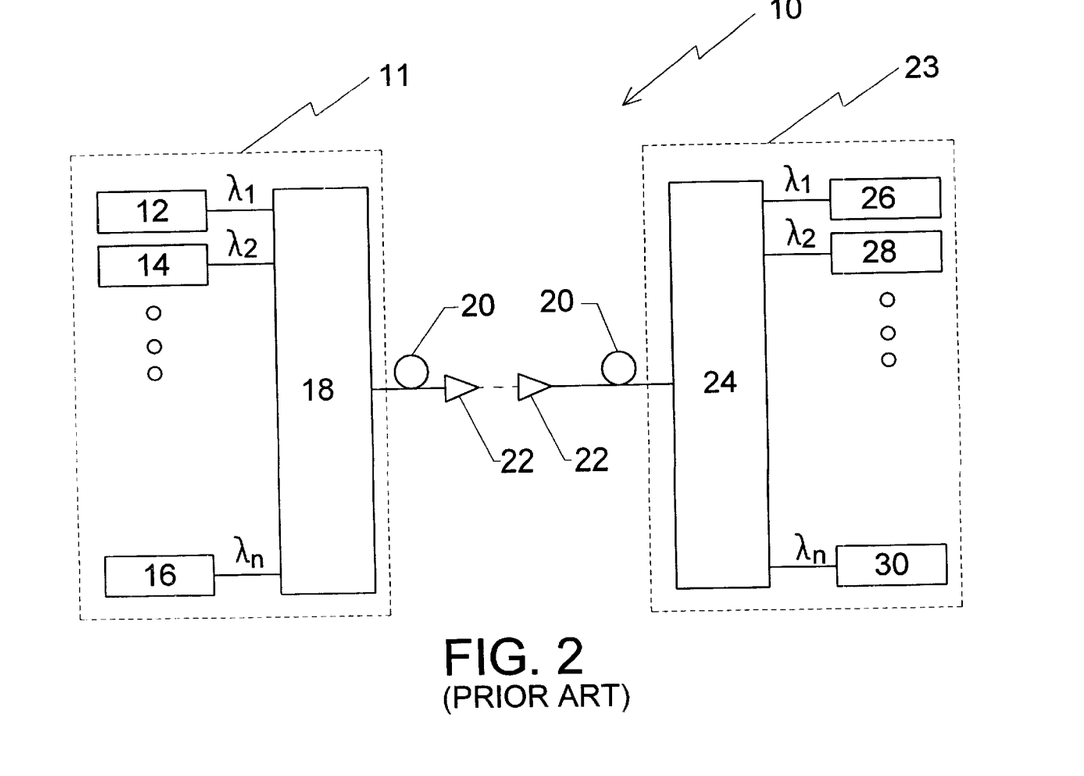
FIG. 2 illustrates a block diagram of a WDM system of the prior art.

In Wavelength Division Multiplexing (WDM) systems, multiple signals are carried by various wavelengths of light through a single optical fiber. A typical WDM system is shown in FIG. 2. The WDM system 10 includes a transmission system 11, which includes a series of transmitters 12, 14, and 16, each coupled to a multiplexer 18. The multiplexer 18 provides an output, which is coupled to an optical fiber 20. Over long distances amplifiers 22 are included along the optical fiber 20. The optical fiber 20 is then also coupled to a receiving system 23, which includes a demultiplexer 24 and a series of receivers 26, 28, and 30. The optical fiber 20 is coupled to an input of the demultiplexer 24 of the receiving system 23. Outputs of the demultiplexer 24 are coupled to the series of receivers 26, 28, and 30.

Figure 3:
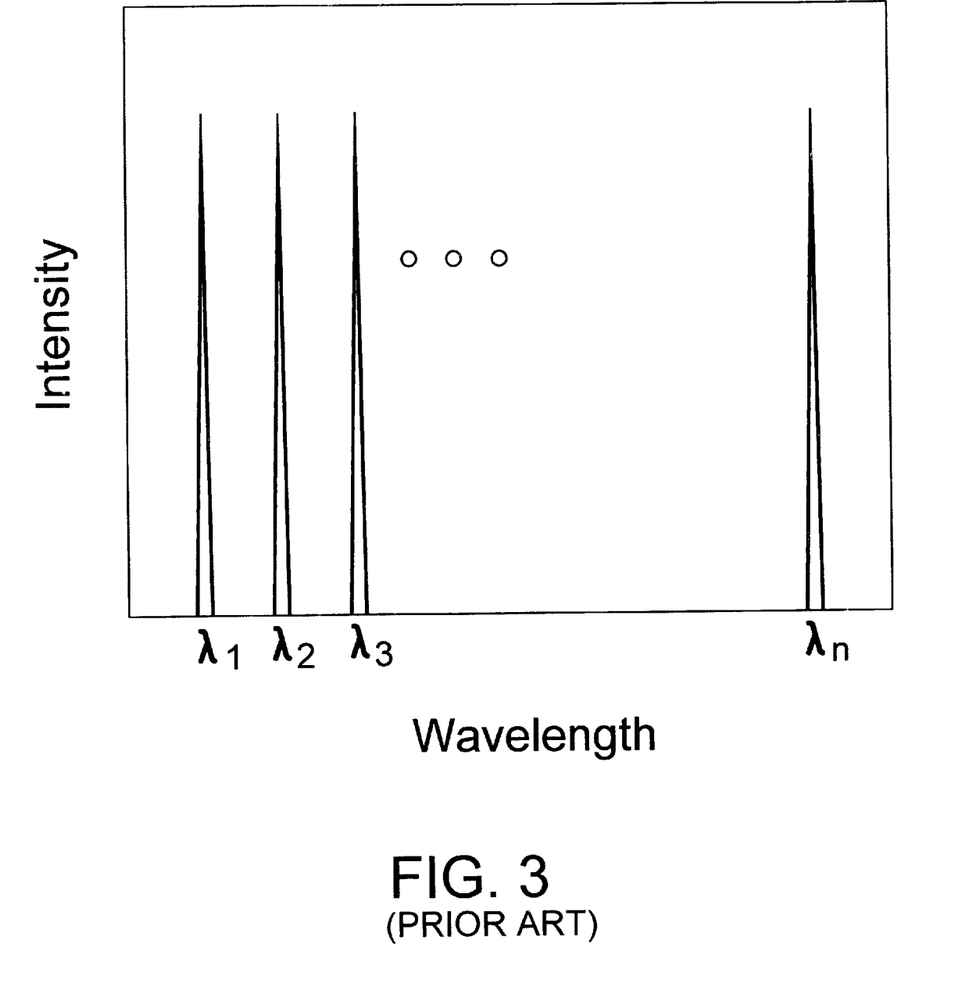
FIG. 3 illustrates a graph of intensity versus wavelength for a wavelength band of WDM light signals of the prior art.

In the WDM system 10, a first transmitter 12 transmits a light signal at a first wavelength ($\lambda_1$), a second transmitter 14 transmits a light signal at a second wavelength ($\lambda_2$) and so forth until an nth transmitter 16 transmits a light signal at an nth wavelength ($\lambda_n$) The shortest wavelength signal and the longest wavelength signal form a wavelength band. The signals are combined by the multiplexer 18, which then transmits the light signals along the optical fiber 20. Over distance the power of the light signals decrease due to attenuation. The light signals are typically amplified about every 50–100 km. For the 1550 nm wavelength band, this amplification is generally performed by an Erbium Doped Fiber Amplifier (EDFA) 22. When the light signals reach their destination they are separated by the demultiplexer 24. The light signals are then received by the receivers 26, 28, and 30. Light signal intensity versus wavelength for a typical wavelength band of WDM light signals is illustrated in FIG.

Flat gain response for EDFAs is crucial to the performance of the WDM system 10, since small variations in gain for various wavelengths will grow exponentially over a series of in-line EDFAs 22. Agrawal in "Fiber Optic Communication Systems," (Wiley. 2nd ed., 1997. pp 414–415) teaches that numerous methods can be used to flatten the gain response of these amplifiers. One method of flattening this gain response is to use channel filters to equalize the gain for various wavelengths. Another method is to adjust the input powers of different wavelengths so that amplification results in uniform intensity for various wavelengths. A third method is to use inhomogeneous broadening of the EDFA gain spectrum to equalize wavelength intensity. A fourth method is to use multiple EDFAs tuned to different wavelength ranges and configured with feedback loops. A final method is to use a filter or series of filters to selectively attenuate the gain response of an EDFA.

Figure 4A:
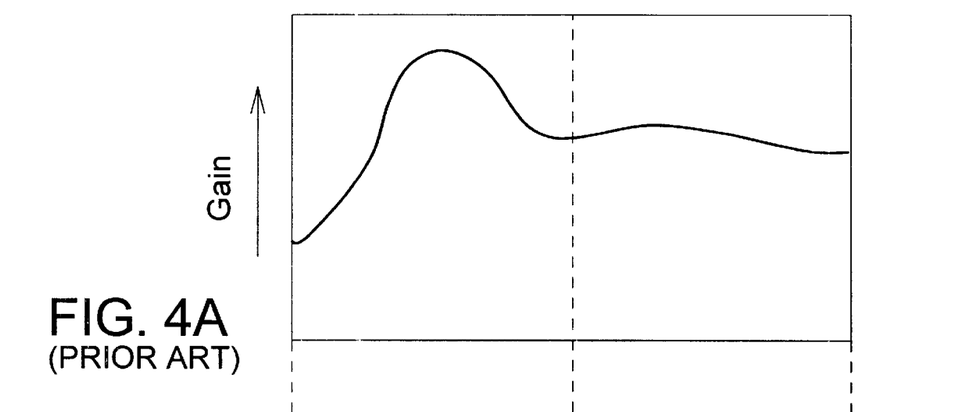
FIG. 4A illustrates an EDFA gain curve over a range of wavelengths of the prior art.
Figure 4B:
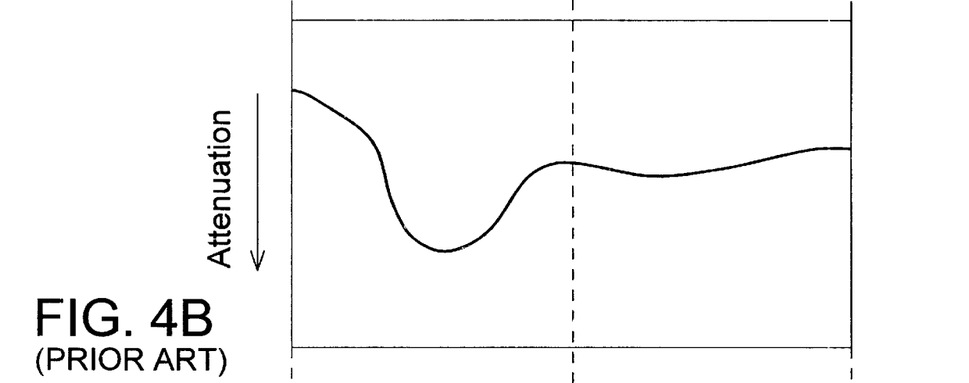
FIG. 4B illustrates a filter attenuation curve over a range of wavelengths for gain band flattening of the prior art.
Figure 4C:
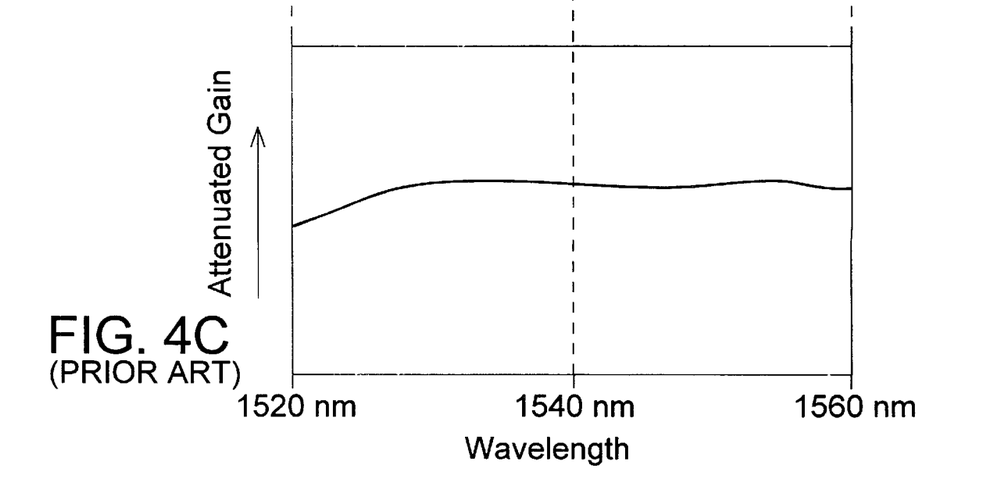
FIG. 4C illustrates an attenuated EDFA gain curve over a range of wavelengths using a filter of the prior art.

A typical gain versus wavelength response for an EDFA is shown in FIG. 4A. When utilizing a filter or series of filters to flatten gain response, an optical filter, with an attenuation curve as shown in FIG. 4B, can be used to selectively attenuate the gain response. The resulting attenuated EDFA gain is shown in FIG. 4C. As shown in FIG. 4C, this attenuated EDFA gain is substantially flat over a range of wavelengths including 1530 nm to 1560 nm. Without a substantially flat gain the quality of the signal received by the receivers 26, 28, and 30 will be poor.

There are many different known methods for selectively attenuating the gain response of an EDFA in order to improve the signal quality of the signals received by the receivers 26, 28, and 30. U.S. Pat. No. 5,260,823 to Payne et al. entitled, "Erbium-Doped Fibre Amplifier with Shaped Spectral Gain," teaches that a wavelength-selective resonant coupling between a propagating core mode to a cladding leaky mode can be used for filtering a wavelength band for EDFA gain flattening. A periodic perturbation of the core forms a grating and the selected wavelength is attenuated by the resonant coupling between the core and the cladding. By varying the perturbation length, various selected wavelengths can be attenuated. Payne et al. also teach that multilayered dielectric coatings can be used for making an optical filter for EDFA gain flattening. A multilayered filtering apparatus includes two coupling lenses and a multilayered dielectric filter. The two coupling lenses connect to an optical fiber and sandwich the multilayered dielectric filter. The multilayered dielectric filter is designed to cancel out the larger gain around the peak wavelength and to be transparent elsewhere.

U.S. Pat. No. 5,473,714 to Vengsarkar entitled, "Optical Fiber System Using Tapered Fiber Devices," teaches that tapered fiber devices can be used for filtering in an optical telecommunications system. Vengsarkar teaches that by tapering an optical fiber, light can be attenuated by wavelength cutoff and direct coupling from a core to a cladding. The tapered fiber device is formed from the optical fiber by heating the optical fiber and stretching it. The taper reduces the diameter of the core to a value close to the cutoff wavelength. Light with wavelengths near and above the cutoff wavelength are coupled directly to the cladding.

U.S. Pat. No. 5,583,689 to Cassidy et al. entitled "Filter With Preselected Attenuation/Wavelength Characteristic," teaches that a fiber grating, with spatially separated parts having different attenuation characteristics, can perform filtering for EDFA gain flattening. The fiber grating is preferably a side-tap Bragg fiber grating. By varying the pitch along the fiber grating an appropriate attenuation profile can be provided for flattening the EDFA gain response.

U.S. Pat. No. 5,067,789 to hall et al. entitled, "Fiber Optical Coupling Filter and Amplifier," teaches that a light-attenuating light path adjacent to a first core within a cladding can be used to filter wavelengths about a specific wavelength for EDFA gain flattening. The light attenuating light path is preferably one or more lossy cores that are evanescently coupled to the first core. The evanescent coupling between the first core and the light attenuating light path is greatest where the effective index of refraction of the first core equals the effective index of refraction of the light attenuating light path. By choosing a single mode or a higher multimode optical waveguide structure for the light attenuating light path, the effective index of refraction for the light attenuating light path can be varied. Hall et al. teach that the index of refraction for the material for the light attenuating light path should be greater than the index of refraction for the material for the first core. Hall et al. further teach that as an alternative embodiment the lossy core could be a lossy annular region located concentrically about the first core and within the cladding. A necessary feature of this filter is that the lossy core or the lossy annular region has specific light absorption characteristics. Since the lossy core or the lossy annular region is contained completely within the cladding, the specific light absorption characteristics dissipates light energy that has been filtered from the first core to the lossy core or the lossy annular region. The absorption characteristics of the lossy core or the lossy annular region determine an amount of attenuation of the filtered wavelengths.

Each of these known methods for filtering an amplified signal from an EDFA can be inefficient, unreliable, and expensive. There is currently a lack of efficient filters for gain flattening in fiber optic systems, which are easy to manufacture and use within a WDM system.

SUMMARY OF THE INVENTION

An all fiber optical filter is formed by stretching an optical fiber. The all fiber filter includes a core, an inner cladding, and an outer cladding. A core index of refraction is greater than an outer cladding index of refraction. The outer cladding index of refraction is greater than an inner cladding index of refraction. The all fiber optical filter attenuates a portion of an optical signal by transferring optical energy from the core to the outer cladding by evanescent coupling. The all fiber optical filter has a compact structure, which prevents bending and provides stable temperature performance.

The all fiber optical filter is preferably used in Wavelength Division Multiplexing (WDM) systems for gain flattening of gain responses from Erbium Doped Fiber Amplifiers (EDFAs). Alternatively, the all fiber optical filter is used in other applications where optical filtering or attenuation is needed.

The all fiber optical filter is manufactured by holding a length of an appropriate optical fiber between two clamps, heating the optical fiber, and stretching the optical fiber until a predetermined characteristic of the optical fiber is achieved.

DETAILED DESCRIPTION OF THE PREFERRED EMBODIMENT

Figure 5:
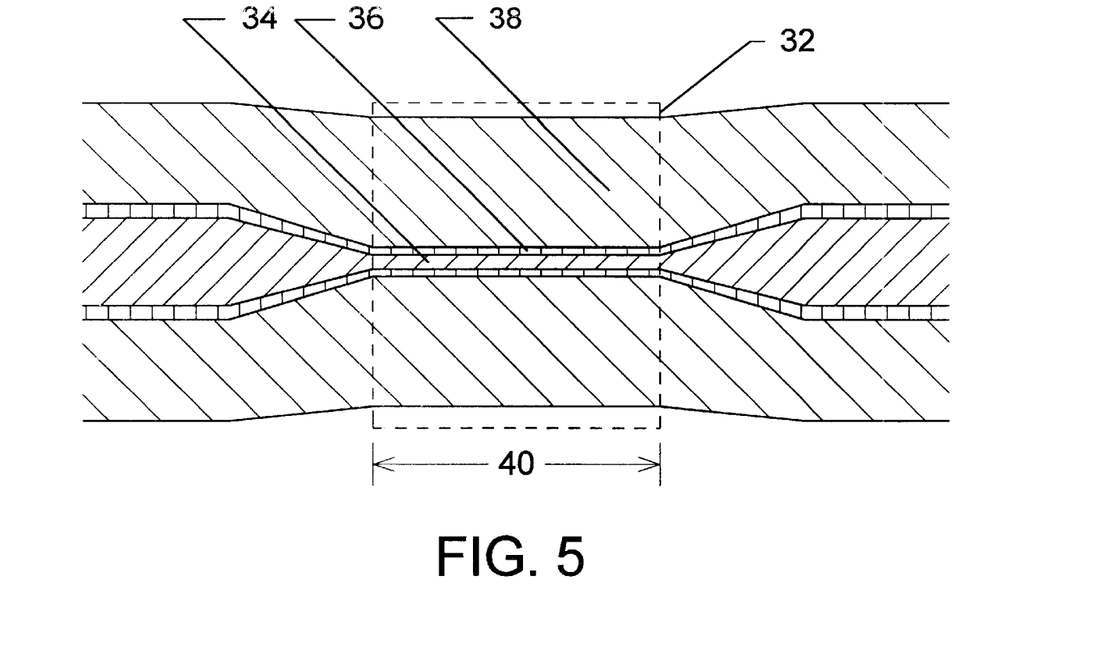
FIG. 5 illustrates a linear cross section of an all fiber optical filter of the present invention.
Figure 6:
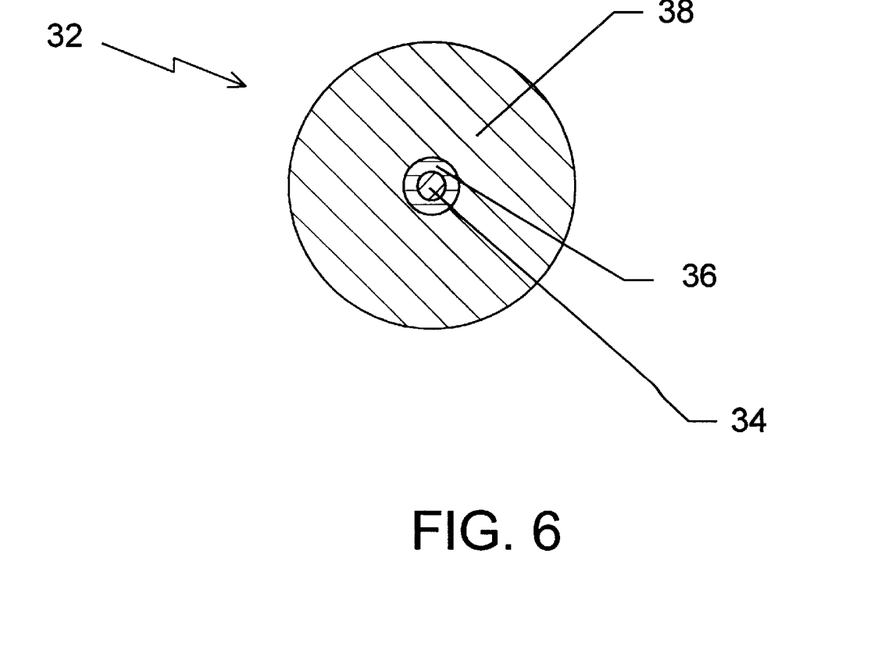
FIG. 6 illustrates a cross-section of the all fiber optical filter of the present invention.

A linear cross section of an all fiber optical filter of the present invention is illustrated in FIG. 5. The all fiber optical filter 32 has a core 34, an inner cladding 36, an outer cladding 38, and a filter length 40. A cross-section of the all fiber optical filter 32 showing the core 34, the inner cladding 36, and the outer cladding 38 is illustrated in FIG. 6. The core 34 has a core diameter. The inner cladding 36 has an inner cladding thickness. The outer cladding 38 has an outside diameter. Indexes of refraction for the core 34, the inner cladding 36, and the outer cladding 38 are referred to as a core index of refraction, an inner index of refraction, and an outer index of refraction, respectively. The core index of refraction is preferably greater than the outer index of refraction. The outer index of refraction is preferably greater than the inner index of refraction. By an appropriate selection of the core index of refraction, the inner index of refraction, and the outer index of refraction as well as selecting, the core diameter and the inner cladding thickness, optical energy from an optical signal within a wavelength range is transferred from the core 34 to the outer cladding 38 by evanescent coupling.

The core 34 of the all fiber optical filter 32 is a single mode waveguide. A convention used when discussing optical waveguides is to refer to an effective index of refraction, which is defined as a waveguide propagation constant $\beta$ divided by a free space wave number $k_o$. The effective index of refraction is both wavelength dependent and mode dependent. A core effective index of refraction for the core 34 has a value between the inner index of refraction and the core index of refraction. Reducing the core diameter reduces the core effective index of refraction provided that the single mode continues to propagate. The outer cladding 38 is a multimode waveguide. The outer cladding is sufficiently large that an outer effective index of refraction for a first mode is equal to the outer index of refraction. The inner cladding 36 forms a barrier between the core 34 and the outer cladding 38. Optical energy will transfer from the core 34 to the cladding 38 by evanescent coupling if the core effective index of refraction is near to the outer index of refraction and the barrier is sufficiently narrow. Since the core effective index of refraction depends upon the core diameter, the core diameter determines a wavelength range that could couple from the core 34 to the outer cladding 38.

The core diameter, the core effective index of refraction, and the outer index of refraction determine a peak attenuation wavelength and a wavelength band about the peak attenuation wavelength that couples from the core 34 to the outer cladding 38. Optical energy that couples from the core 34 to the outer cladding 38 and is propagating in the first mode can couple back to the core 34. Accordingly, the outer diameter of the outer cladding and the filter length 40 adjust the peak attenuation wavelength and the wavelength band about the peak wavelength. Depending upon a variation of the core effective index of refraction with wavelength, other peak attenuation wavelengths and wavelength bands could couple from the core 34 to the outer cladding 38.

Figure 7:
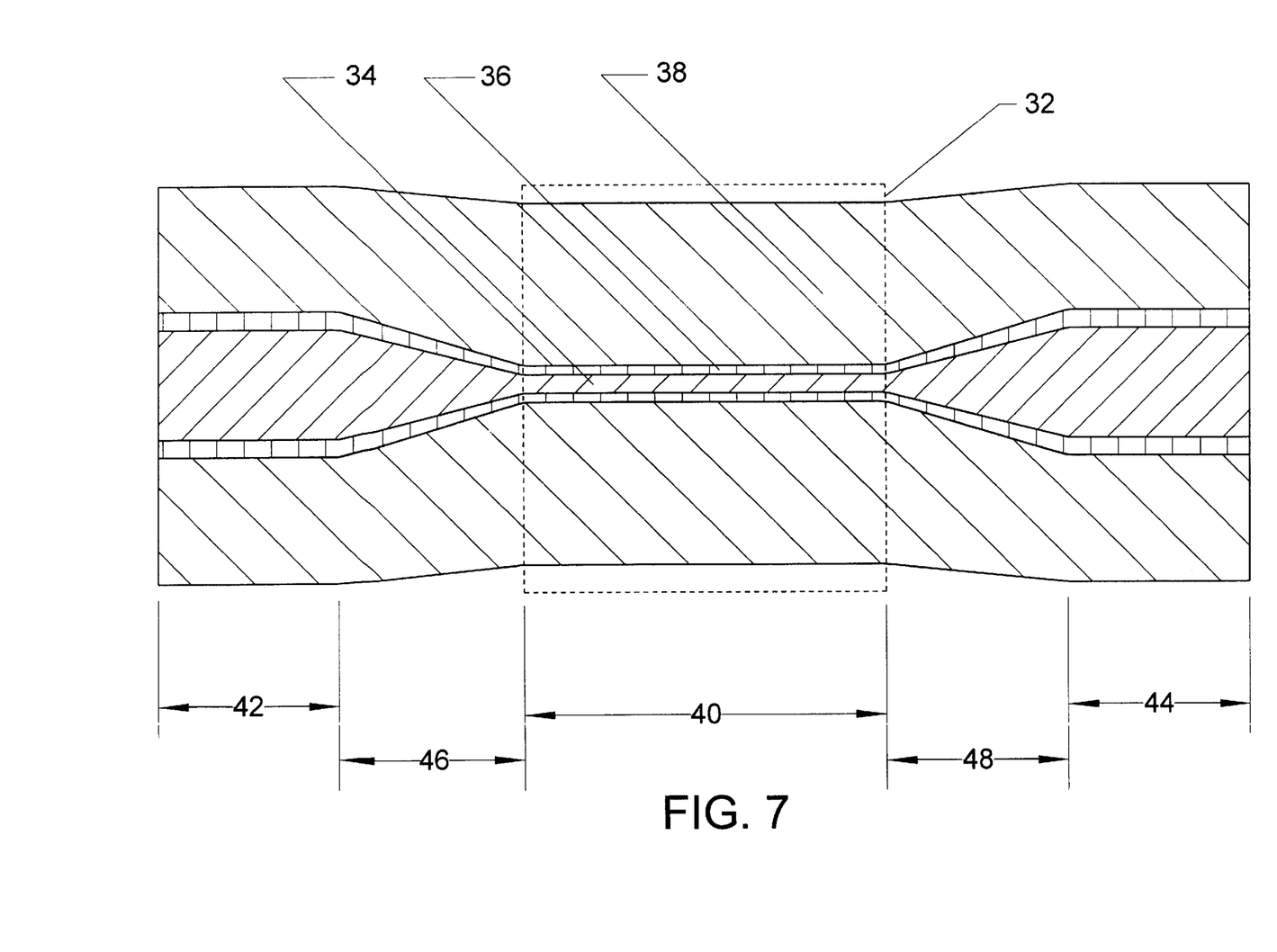
FIG. 7 illustrates the all fiber optical filter and additional structure of the present invention.

The all fiber optical filter 32 and additional structure is illustrated in FIG. 7. The additional structure includes an input length 42, an output length 44, a first transition 46, and a second transition 48. The input length 42 connects to the first transition 46, which connects to the all fiber optical filter 32. The all fiber optical filter 32 connects to the second transition 48, which connects to the output length 44. The core 34, the inner cladding 36, and the outer cladding 38 of the all fiber optical filter 32 extend through the input length 42, the first transition 46, the second transition 48, and the output length 44. The thickness of the inner cladding 36, within the input length 42 and the output length 44, is greater than an evanescent coupling thickness that allows evanescent coupling between the core 34 and the outer cladding 38 within the input length 42 and the output length 44. The input length 42 and the output length 44 are coupled to an optical fiber system by appropriate means available for coupling optical fiber components.

Figure 8A:
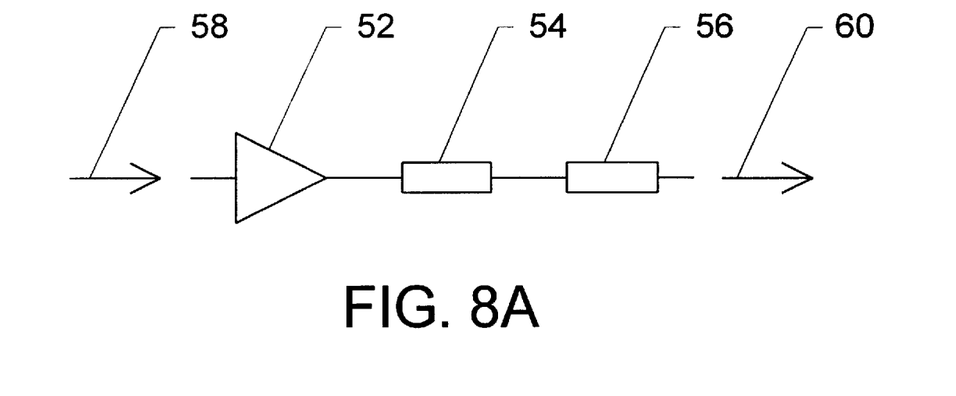
FIGS. 8A, 8B, and 8C illustrate configurations including an EDFA, a first all fiber optical filter, and a second all fiber optical filter of the present invention.

An exemplary configuration including an EDFA and a cascaded series of all fiber optical filters used to flatten the EDFA gain over wavelength ranges of 1529 nm to 1562 nm and 1580 nm to 1620 mn is illustrated in FIG. 8A. The EDFA 52 is coupled to a first all fiber optical filter 54. The first all fiber optical filter 54 is coupled to a second all fiber optical filter 56. An input optical signal 58 is provided to the EDFA 52, which amplifies the input optical signal 58 and provides an amplified optical signal. The amplified optical signal is then provided to the first all fiber optical filter 54, which filters the amplified optical signal and provides a first filtered optical signal. The first filtered optical signal is then provided to the second all fiber optical filter 56, which filters the first filtered optical signal and provides an output optical signal 60.

Figure 8B:
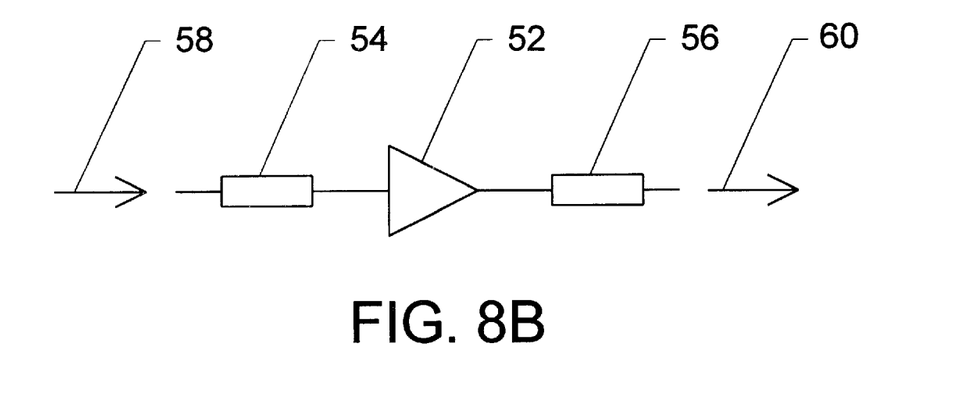
Figure 8C:
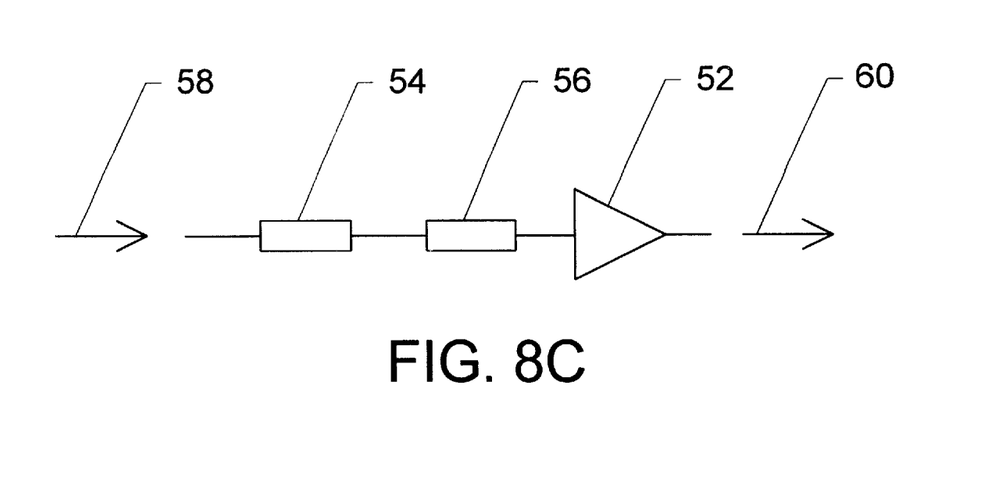

Other configurations for the EDFA 52, first all fiber optical filter 54, and the second all fiber optical filter 56 are illustrated in FIGS. 8B and 8C. In FIG. 8B, the first all fiber optical filter 54 is coupled to the EDFA 52, which is coupled to the second all fiber optical filter 56. In FIG. 8C, the first all fiber optical filter 54 is coupled to the second all fiber optical filter, which is coupled to the EDFA 52.

In the preferred embodiment of the present invention, intended to operate in the wavelength ranges of 1529 nm to 1562 mn and 1580 nm to 1620 nm, the core 34, the inner cladding 36, and the outer cladding 38 are silica glasses. The indexes of refraction are preferably 1.467 for the core index of refraction, 1.411 for the inner index of refraction, and 1.424 for the outer index of refraction. The core diameter is preferably within the range and including 3 $\mu$m and 6 $\mu$m. An outer diameter for the inner cladding 36 is preferably within the range and including 12 $\mu$m and 30 $\mu$m. The outside diameter of the outer cladding 38 is preferably within the range and including 50 $\mu$m and 85 $\mu$m. The filter length 40 is preferably within the range and including 10 mm and 20 mm. Specific dimensions for the preferred embodiment are a result of a forming process, which preferably uses an optical spectrum response for the all fiber optical filter 32 as a critical parameter.

The preferred embodiment for the all fiber optical filter 32 is formed by identifying a preferred peak EDFA gain response and a preferred wavelength band about the preferred peak gain response that is to be flattened. An inverse of the gain response for the preferred wavelength band becomes a preferred target response for the all fiber optical filter 32 such that the all fiber optical filter 32 provides a preferred attenuation response that is near to the preferred target response after the forming process.

Referring to FIG. 8A, the EDFA 52 provides the amplified optical signal, which is used to determine the first peak EDFA gain response and the first wavelength band. For a test EDFA used in testing an all fiber optical filter of the present invention, the preferred peak EDFA gain response was found to be at 1533 nm with a preferred relative gain response of 6.0 dB. The relative gain response is defined as the difference between a specific gain response for a specific wavelength and a minimum gain response for the wavelength range. The preferred target response about 1533 nm was used in the forming process so that after the forming process, the all fiber optical filter 32 provided the preferred attenuation curve.

An alternative embodiment is formed by identifying an alternate target response for an alternate peak EDFA gain response and an alternate wavelength band about the alternate peak EDFA gain response. For the test EDFA, the alternate peak wavelength was found to be at 1552 nm with an alternate relative gain response of 3.83 dB.

Figure 9A:
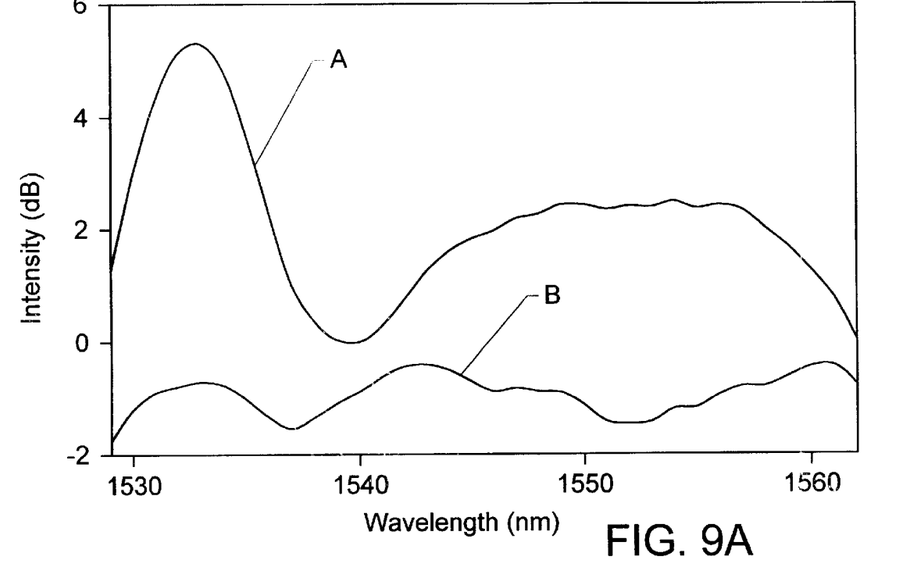
FIGS. 9A and 9B illustrate intensity versus wavelength for an EDFA gain response and a filtered EDFA gain response of the present invention.

Referring to FIG. 8A, tests were performed in which the EDFA 52 was the test EDFA, the first all fiber optical filter 54 was the preferred embodiment of the all fiber optical filter described above and having the preferred attenuation response, and the second all fiber optical filter 56 was the alternative embodiment of the all fiber optical filter described above and having an alternate attenuation response. Test results using this configuration for the wavelength range from 1529 nm to 1562 nm are illustrated in FIG. 9A. The EDFA gain response is shown as the curve A. The first target response is the inverse of the EDFA gain response from 1529 nm to 1540 nm. The second target response is the inverse of the EDFA gain response from 1540 nm to 1562 nm. The output optical signal 60 is shown as the curve B, which shows a substantially flat attenuated EDFA gain curve over the wavelength range from 1529 nm to 1562 nm.

Figure 9B:
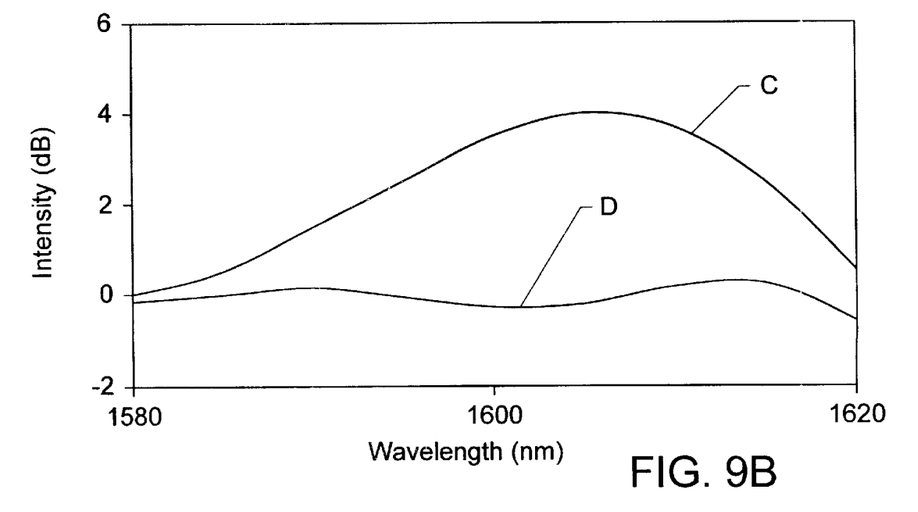

Test results using this configuration for the wavelength range from 1580 nm to 1620 are illustrated in FIG. 9B. The EDFA gain response is shown as the curve C. The output optical signal 60 is shown as the curve D, which shows a substantially flat attenuated gain curve over the wavelength range from 1580 nm to 1620 nm.

Figure 10:
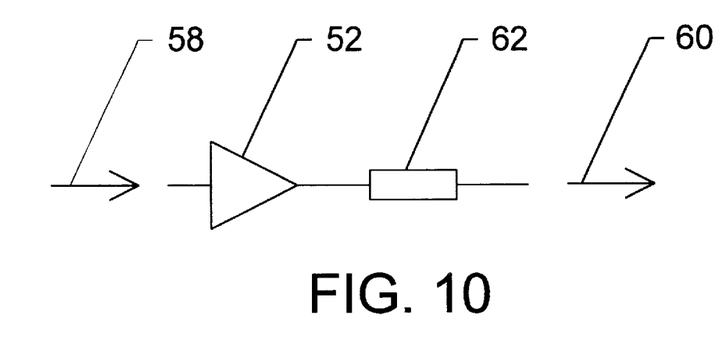
FIG. 10 illustrates an EDFA and an all fiber optical filter of the present invention.

An alternative embodiment comprising the EDFA 52 and a single all fiber optical filter is illustrated in FIG. 10.

Depending upon the gain response of the EDFA 52 the single all fiber optical filter 62 will suffice to flatten the gain response of the EDFA 52. The EDFA 52 is coupled to the single all fiber optical filter 62. The input optical signal 58 is provided to the EDFA 52, which amplifies the input optical signal 58 and provides an amplified optical signal. The amplified optical signal is then provided to the single all fiber optical filter 62, which filters the amplified optical signal and provides the output optical signal 60.

Figure 11:
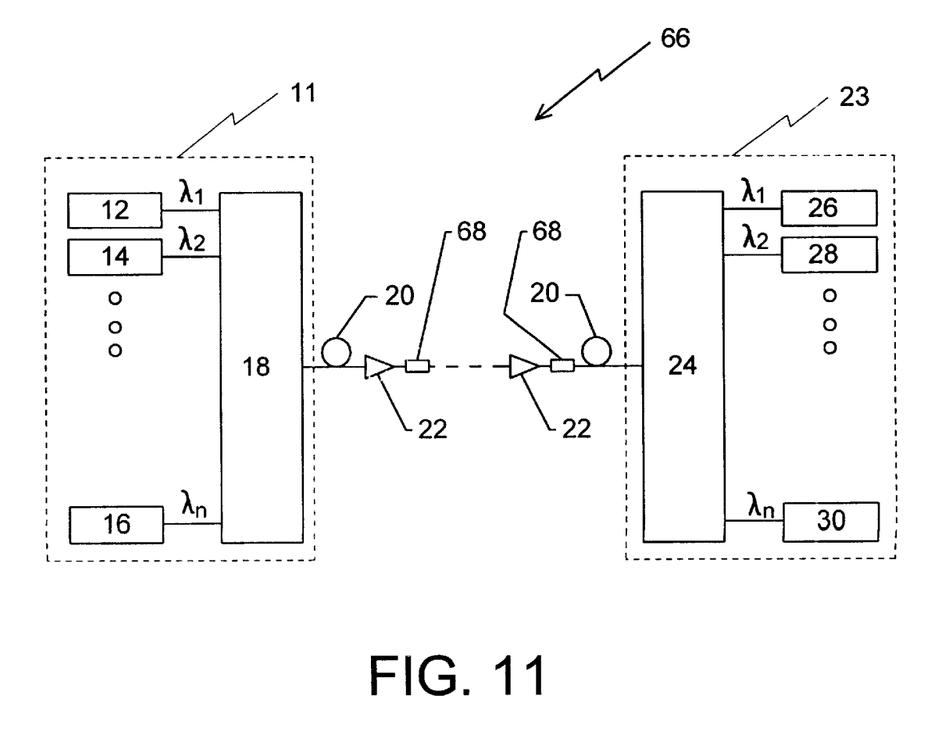
FIG. 11 illustrates a WDM system including the all fiber optical filter of the present invention.

A WDM system with EDFA gain flattening including one or more all fiber optical filters according to the present invention is illustrated in FIG. 11. The WDM system 66 includes a transmission system 11, which includes a series of transmitters 12, 14, and 16 each coupled to a multiplexer 18. The multiplexer 18 provides an output, which is coupled to an optical fiber 20. Over long distances EDFAs 22 and the one or more all fiber optical filters 68 are included along the optical fiber 20. The optical fiber 20 is then also coupled to a receiving system 23, which includes a demultiplexer 24 and a series of receivers 26, 28, and 30. The optical fiber 20 is coupled to an input of the demultiplexer 24 of the receiving system 23. Outputs of the demultiplexer 24 are coupled to the series of receivers 26, 28, and 30.

In the WDM system 66, a first transmitter 12 transmits a light signal at a first wavelength ($\lambda_1$), a second transmitter 14 transmits a light signal at a second wavelength ($\lambda_2$), and so forth until an nth transmitter 16 transmits a light signal at an nth wavelength ($\lambda_n$). The light signals are combined by the multiplexer 18, which then transmits the light signals along the optical fiber 20. Over distance the power of the light signals decrease due to attenuation. The light signals are amplified approximately every 50–100 km by the EDFAs 22, the one or more all fiber optical filters 68 flatten the EDFA gain for the light signals, as discussed above. When the light signals reach their destination they are separated by the demultiplexer 24. The light signals are then received by the receivers 26, 28, and 30.

Figure 12:
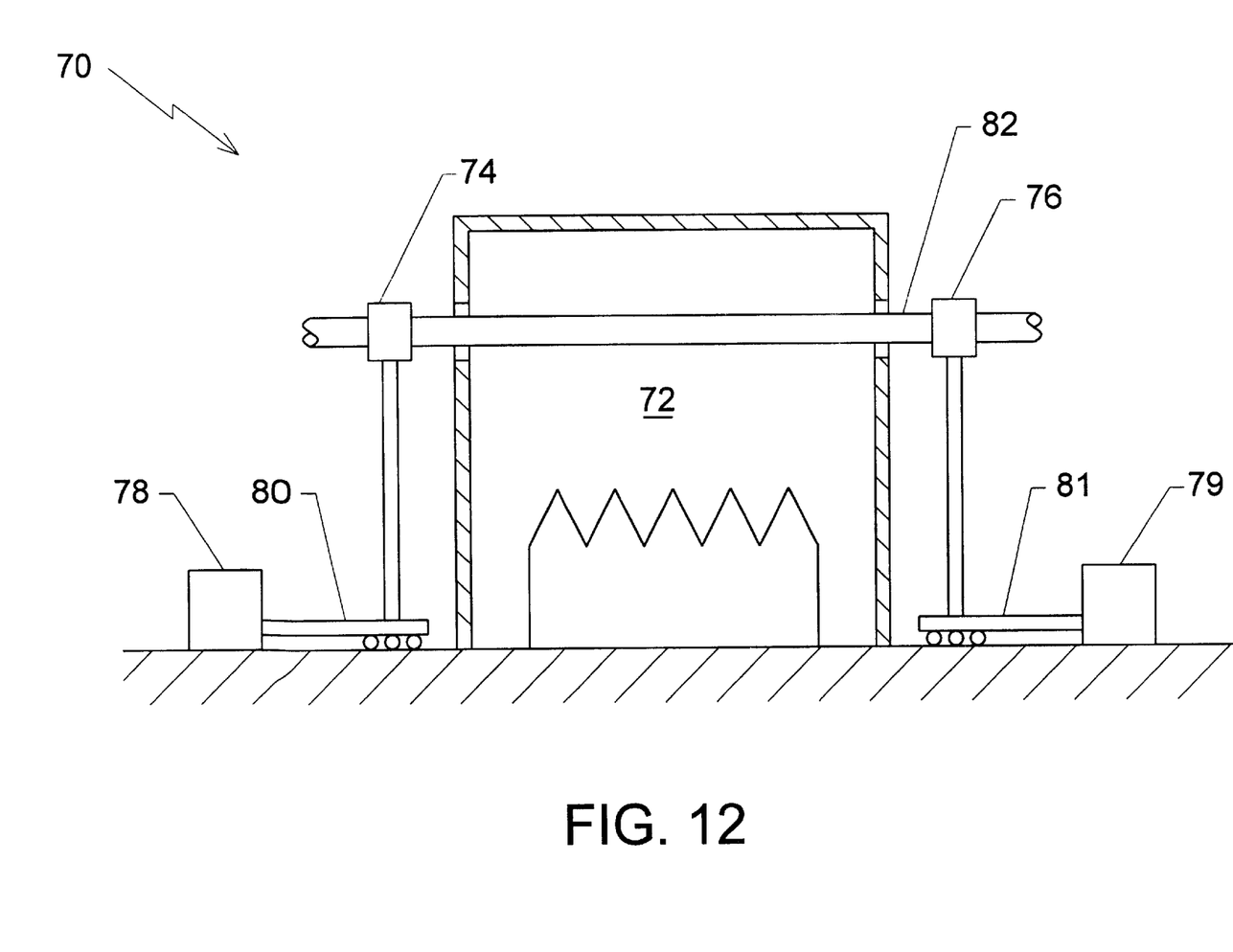
FIG. 12 illustrates a first apparatus for making the all fiber optical filter of the present invention.

A first apparatus for manufacturing the all fiber optical filter of the present invention is illustrated in FIG. 12. The first apparatus 70 includes a heating source 72, a first clamp 74, a second clamp 76, a first stepper motor 78, a second stepper motor 79, a first drive means 80, and a second drive means 81. The first clamp 74 is placed to one side of the heating source 72. The second clamp 76 is placed adjacent to the heating source 72 on the side opposite to the first clamp 74. The first clamp 74 is connected to the first stepper motor 78 by the first drive means 80. The second clamp 76 is connected to the second stepper motor 79 by the second drive means 81.

A first method of manufacture uses the first apparatus 70. An initial length of optical fiber 82 is held between the first clamp 74 and the second clamp 76. The heating source 72 heats the optical fiber 82 to within an allowed temperature range. The first stepper motor 78 actuates the first drive means 80. The second stepper motor 79 actuates the second drive means 81. Consequently, the first clamp 74 and the second clamp 76 are further separated. This further separation stretches the optical fiber 82. When a predetermined stretch distance has been reached the first and second stepper motor 78 and 79 are stopped, which stops the first and second clamp 74 and 76. Finally, the heating source 72 is removed, the heating source 72 is turned off, or the optical fiber 82 is removed from the heating source 72. This results in an all fiber optical filter, according to the present invention, having a predetermined filter length.

Figure 13:
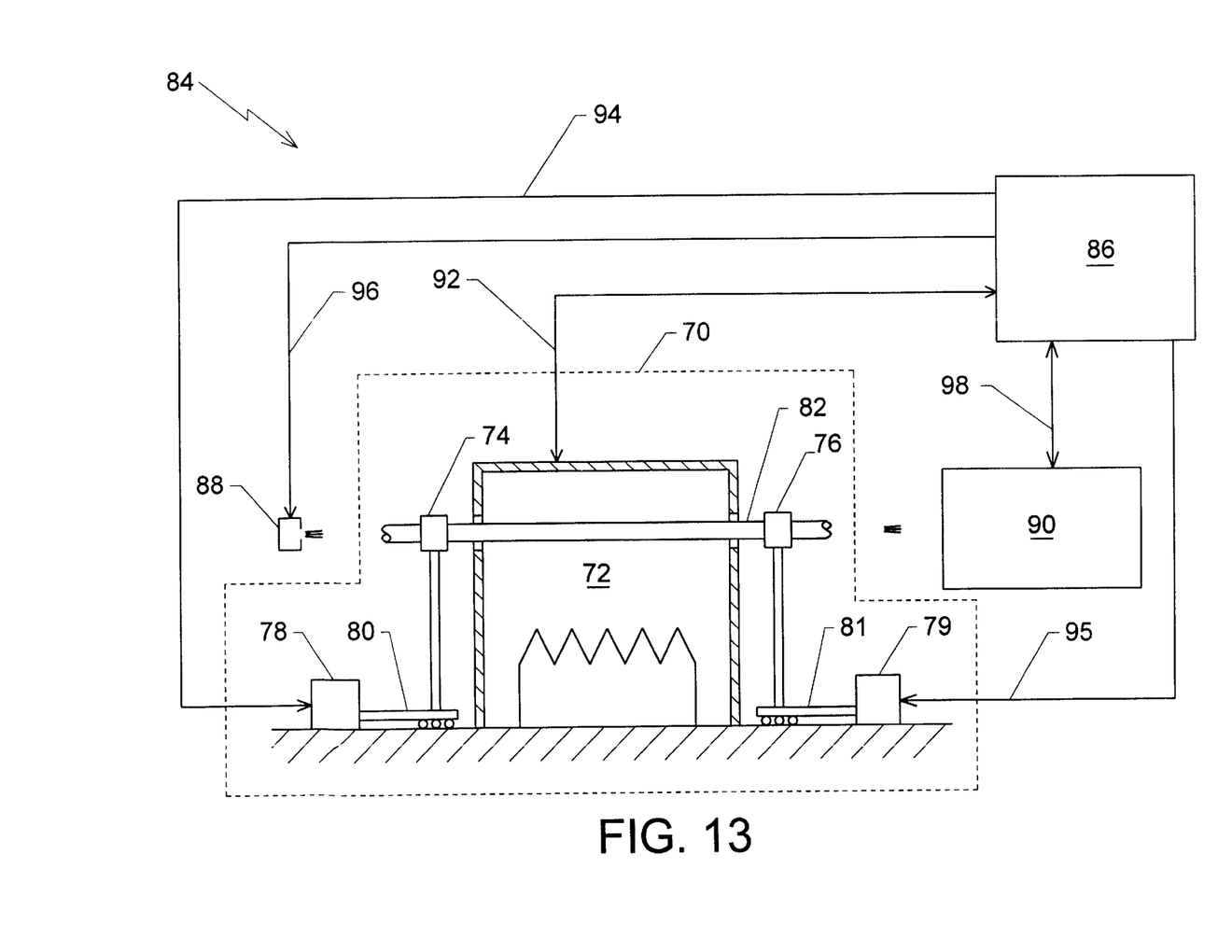
FIG. 13 illustrates a second apparatus for making the all fiber optical filter of the present invention.

A second and preferred apparatus for manufacturing the all fiber optical filter of the present invention is illustrated in FIG. 13. The second apparatus 84 includes the first apparatus 70, a process control unit 86, a light source 88, and an optical spectrum analyzer 90. The light source 88 is located at one end of the optical fiber 82. The optical spectrum analyzer 90 is located at the end of the optical fiber 82 opposite to the light source 88. The process control unit 86 controls and monitors the heating source 72 through a first control link 92. The process control unit 86 controls the first stepper motor 78 through a second control link 94. The process control unit 86 controls the second stepper motor 79 through a third control link 95. The process control unit 86 controls the light source 88 through a fourth control link 96. Tile process control unit 86 controls and monitors the optical spectrum analyzer 90 through a fifth control link 98.

A second and preferred method of manufacture uses the second apparatus 84. The initial length of optical fiber 82 is held between the first clamp 74 and the second clamp 76. The process control unit 86 signals and monitors the heating source 72. The heating source 72 heats the optical fiber to within the allowed temperature range. The process control unit 86 turns on the light source 88. The light source 88 couples light to the optical fiber 82. Preferably, the light source 88 is a white light source. The optical fiber 82 transmits the light to the end of the optical fiber 82 opposite the light source 88. The light exits the optical fiber 82. The process control unit turns on the optical spectrum analyzer 90. The optical spectrum analyzer 90 detects the light that exits from the optical fiber 82. The process control unit 86 signals the first and second stepper motors 78 and 79. The first and second stepper motors 78 and 79 further separate the first and second clamps 74 and 76. This further separation stretches the optical fiber 82. As the optical fiber 82 is stretched, the light signal at the end of the optical fiber adjacent to the optical spectrum is monitored for a predetermined optical spectrum response that is based on the target response, as described above. When the optical spectrum analyzer 90 detects the predetermined optical spectrum response, the process control unit 86 stops the first and second stepper motors 78 and 79, thereby stopping the first and second clamp 74 and 76. Finally, the process control unit signals the heating source 72 to stop heating. This results in an all fiber optical filter, according to the present invention, having a desired attenuation response.

Preferably, the optical fiber 82 used to form the all fiber optical filter 32 of the present invention has a core with an initial diameter of 8.3 μm, an inner cladding with an initial outside diameter of 45 μm, and an outer cladding with an initial outside diameter of 125 μm. Preferably, a length of 6 mm is heated by the heating source 72 to a temperature within the range between 900° C. and 1100° C. The optical fiber 82 is stretched to a length of about 15 mm. Preferably, the specific stretch length and other dimensions of the all fiber optical filter are determined by the predetermined optical spectrum response.

It will be readily apparent to one skilled in the art that other various modifications may be made to the preferred embodiment without departing from the spirit and scope of the invention as defined by the appended claims. Specifically, the all fiber optical filter of the present invention could be used to flatten the gain of other rare earth doped fiber amplifiers or the all fiber optical filter of the present invention could be used to filter or attenuate any optical signal.

We claim:

1. An all fiber optical filter formed from stretching an optical fiber and comprising a fiber optic core, an inner cladding formed concentrically about the fiber optic core, and an outer cladding formed concentrically about the inner cladding, wherein an outer index of refraction of the outer cladding is less than a core index of refraction of the fiber optic core and further wherein the outer index of refraction is greater than an inner index of refraction of the inner cladding, wherein the optical fiber is stretched to form:
  a. a filter length separating non-stretched input and output lengths;
  b. a reduced diameter core along the filter length; and
  c. a reduced thickness inner cladding along the filter length;
    and further wherein the optical fiber is stretched until evanescent coupling is achieved between the fiber optic core and the outer cladding along the filter length.

2. The all fiber optical filter as claimed in claim 1 wherein the all fiber optical filter is configured to receive an optical signal, including a gain, from a fiber amplifier.

3. The all fiber optical filter as claimed in claim 2 wherein the optical signal is filtered by the evanescent coupling between the fiber optic core and the outer cladding to flatten the gain.

4. The all fiber optical filter as claimed in claim 1 wherein the optical fiber is stretched until a filter optical response is approximately equal to a target optical spectrum response.

5. The all fiber optical filter as claimed in claim 4 wherein the target optical spectrum response is an inverse of a portion of an amplifier gain spectrum.

6. An all fiber optical filter formed by stretching an optical fiber and comprising:
  a. a single mode fiber optic core having a core index of refraction;
  b. an inner cladding formed concentrically about the single mode fiber optic core, the inner cladding having an inner index of refraction, the inner index of refraction being less than the core index of refraction; and
  c. an outer cladding formed concentrically about the inner cladding, the outer cladding having an outer index of refraction, the outer index of refraction being less than the core index of refraction, the outer index being greater than the inner index of refraction;
  wherein the optical fiber is stretched to form:
    i. a filter length separating non-stretched input and output lengths;
    ii. a reduced diameter core along the filter length; and
    iii. a reduced thickness inner cladding along the filter length;
      and further wherein the optical fiber is stretched until a filter optical response is approximately equal to a target optical spectrum response.

7. The all fiber optical filter as claimed in claim 6 wherein the target optical spectrum response is an inverse of a portion of an amplifier gain spectrum.

8. An all fiber optical filter for flattening gain of an amplified optical signal provided from a fiber amplifier comprising:
  a. a fiber optic core having an input lengths a filter length, an output length and a first index of refraction, wherein the input length is separated from the filter length by a first transition length and the filter length is separated from the output length by a second transition length and further wherein the first transition length has a decreasing diameter from the input length to the filter length and the second transition length has an increasing diameter form the filter length to the output length;
  b. an inner cladding formed concentrically about the fiber optic core, the inner cladding having a second index of refraction and an input thickness formed about the input length of the fiber optic core and a filter thickness formed about the filter length of the fiber optic core and a first smooth variation thickness from the input thickness to the filter thickness, the inner cladding having an output thickness formed about the output length of the fiber optic core, the inner cladding having a second smooth variation thickness form the filter thickness to the output thickness; and
  c. an outer cladding formed concentrically about the inner cladding the outer cladding having a third index of refraction which is less than the first index of refraction and greater than the second index of refraction.

9. The all fiber optical filter as claimed in claim 8 wherein a core diameter of the fiber optic core and the filter thickness are of dimensions to promote evanescent coupling between the fiber optic core and the outer cladding.

10. The all fiber optical filter as claimed in claim 9 wherein the optical filter is configured to receive an optical signal, including a gain, from a fiber amplifier.

11. The all fiber optical filter as claimed in claim 10 wherein the optical filter is filtered by the evanescent coupling between the fiber optic core and the outer cladding to flatten the gain.

12. An all fiber optical filter comprising an optical fiber having:
  a. an input length comprising a core, an inner cladding, and an outer cladding such that in operation the core carries a lightwave signal without the lightwave signal coupling to the outer cladding along the input length;
  b. a filter length coupled to the input length and comprising the core, the inner cladding, and the outer cladding where:
    i. the core along the filter length has a smaller diameter than the core along the input length; and
    ii. the inner cladding along the filter length has a smaller thickness than the inner cladding along the input length;
  such that in operation a portion of the lightwave signal couples to the outer cladding along the filter length by evanescent coupling; and
  c. an output length of optical fiber coupled to the filter length and comprising the core, the inner cladding, and the outer cladding such that in operation a remainder of the lightwave signal does not couple from the core to the outer cladding along the output length.

* * * * *

UNITED STATES PATENT AND TRADEMARK OFFICE
CERTIFICATE OF CORRECTION

PATENT NO.    : 6,362,916 B2
DATED         : March 26, 2002
INVENTOR(S)   : Wu et al.

It is certified that error appears in the above-identified patent and that said Letters Patent is hereby corrected as shown below:

<u>Title page,</u>
Item [12], for Patent Number "5,892,615" delete "Gruff et al." and replace with -- Grubb et al. --.

Signed and Sealed this

Twenty-second Day of October, 2002

Attest:

Attesting Officer

JAMES E. ROGAN
*Director of the United States Patent and Trademark Office*